United States Patent [19]

Story

[11] 4,210,981

[45] Jul. 8, 1980

[54] ECTATING RING SHIRRING METHOD AND APPARATUS

[75] Inventor: Albert G. Story, Brookfield, Ill.

[73] Assignee: Union Carbide Corporation, New York, N.Y.

[21] Appl. No.: 947,041

[22] Filed: Sep. 29, 1978

[51] Int. Cl.² ............................................. A22C 13/02
[52] U.S. Cl. ........................................ 17/45; 17/1 F; 17/41; 17/49
[58] Field of Search ..................... 17/41, 42, 49, 1 F, 17/; 138/118.1, 118

[56] References Cited

U.S. PATENT DOCUMENTS

| | | | |
|---|---|---|---|
| 3,988,804 | 11/1974 | Regner et al. | 17/45 |
| 4,075,736 | 2/1978 | Riegler | 17/42 |
| 4,085,483 | 4/1978 | Winkler | 17/42 |

*Primary Examiner*—Willie G. Abercrombie
*Attorney, Agent, or Firm*—Maurice W. Ryan

[57] ABSTRACT

Sausage casing is shirred into pleated compressed sticks by an annular shirring ring-disc disposed with its axial centerline displaced from the casing axial centerline and also tilted with respect to the casing axial centerline so as to effect a continuous ectating motion against the casing being shirred as the center of the ring-disc revolves around the casing axis.

6 Claims, 16 Drawing Figures

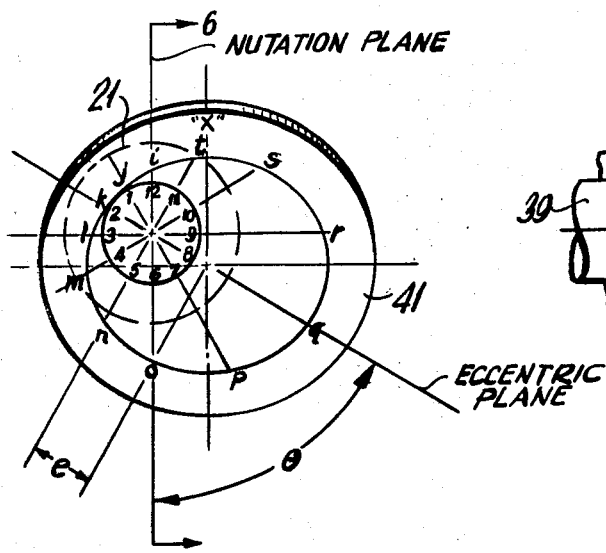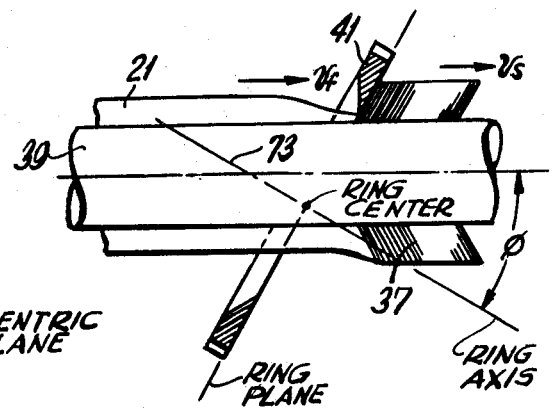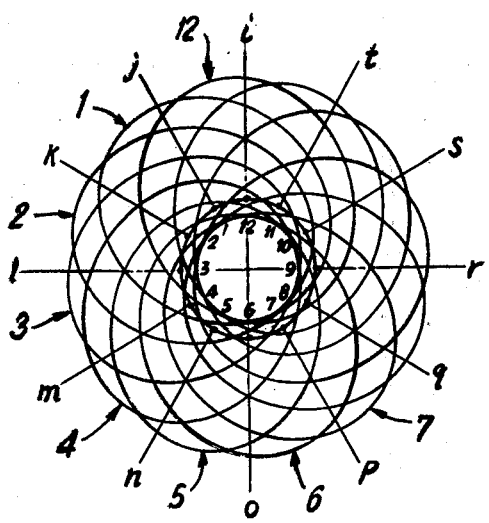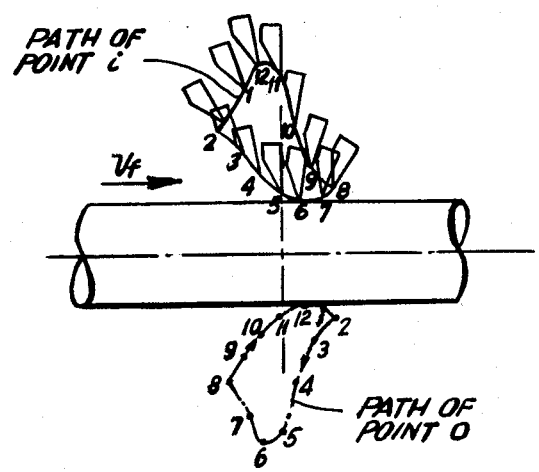
FIG. 5 FIG. 6
FIG. 7 FIG. 8

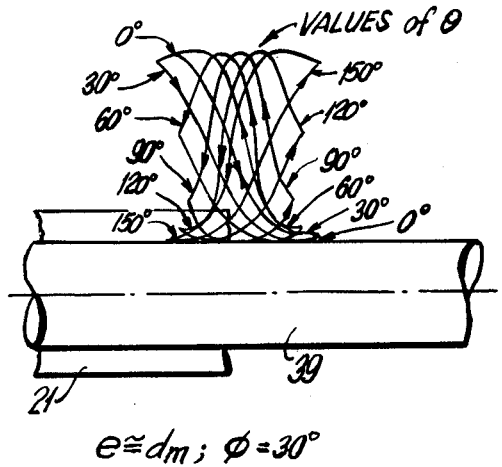
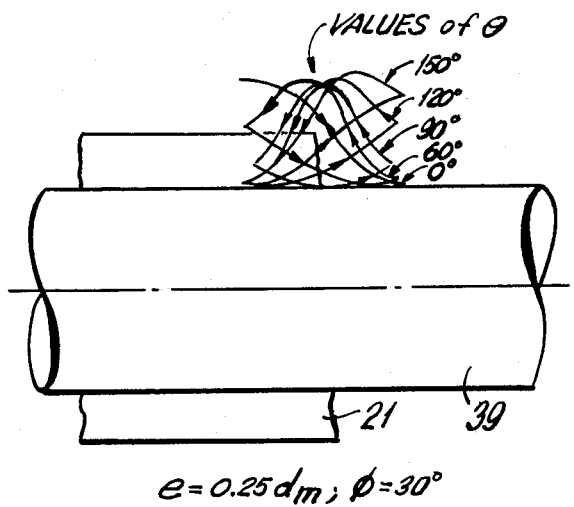
FIG. 9
FIG. 10
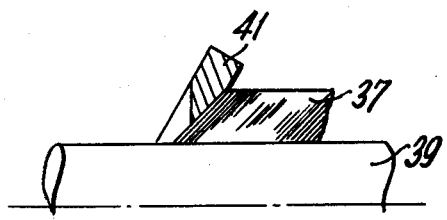
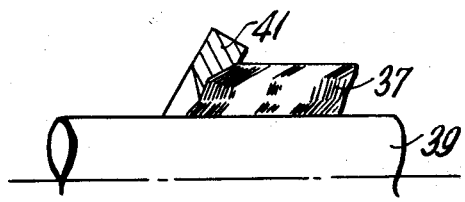
FIG. 11
FIG. 12
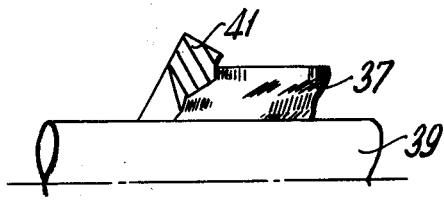
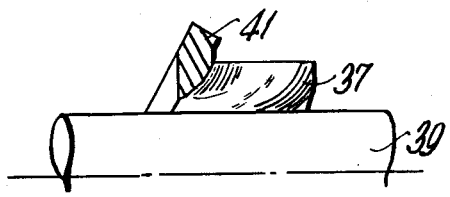
FIG. 13
FIG. 14

ECTATING RING SHIRRING METHOD AND APPARATUS

This invention relates to a method and apparatus for shirring cylindrical tubings, particularly casings used in the production of sausage products with a technique and apparatus which effects an ectating motion in the shirring operation. The terms "ectating" and "ectation," as used herein, relate to and define a motion made which is a combination and resultant of eccentric revolution and nutation motions, as will be more fully described hereinafter.

The production of present day sausage products evolved historically from the hand stuffing of lengths of animal intestines with meat products to form selected lengths or links of the product for further processing such as smoking, curing, or cooking, or for use or retail sale. In modern sausage product manufacture, flexible tubular synthetic film casings are used extensively by the industry in making such products as frankfurters, link sausage, balogna, salami, various types of wursts, and in the packaging of ground and shredded meats, such as hamburger and poultry.

Tubings with which this invention is mainly concerned are made of regenerated cellulose, cellulose derivatives, amylose, alginates, collagen, microporous plastic films, and films of polyethylene, polyvinylidene dichloride, amongst others. Some tubings may include fibrous reinforcement elements. The tubing diameters range from about 18 millimeters to about 120 millimeters, and tubing wall thicknesses are from about 0.02 millimeters to about 0.10 millimeters.

For convenience in handling, packaging, storing, transporting and utilizing, relatively long lengths of tubing from about 10 to about 50 meters or more, are shirred and compressed into short lengths or sticks of about 15 to about 60 centimeters in length.

The efficient manufacture of high quality sticks has developed into an art in itself, following, and sometimes in fact leading, the developments and advances in the ever forward movement of automatic sausage manufacture. Automatic stuffing and linking operations require precisely made sticks of consistently reliable structural integrity to insure against casing failure and consequent shutdown and loss of production. The sticks must be straight, coherent, flexurally stiff, free from pinholes and structural deficiencies which could cause breakage during stuffing, and must have sufficiently large and smooth internal bores to facilitate high speed stuffing on modern automatic stuffing equipment. It is additionally important that the sticks have coherence, uniform density of packing of the pleats, and uniformity of the packing itself to insure that the force required to deshirr will be of constant value and thus facilitate uniform stuffing.

Axial shortening of flexible tubing or shirring has been accomplished basically by the multiple folding or pleating of the tubing walls in a more or less accordion-like fashion by gathering an inflated tubing into pleats and then applying axial compressive force to pack the pleats into a tight interlocking coherent structure. Known methods of shirring comprehend passing the tubing over a hollow mandrel through which air is passed to inflate the tubing, and impinging lugs, cogs, chains, wheels or the like shirring elements on the tubing continuously in the direction of the longitudinal axis of the tubing to pleat it up and compress it against a yieldable restraining force. All of the early known shirring techniques involve a scraping or sliding frictional movement of each discrete shirring element on the outer surface of the casing, first along a longitudinal direction and then radially outward, which quite naturally introduces a risk of damage to the casing. If the spacing between shirring element contacts with the casing is increased towards reducing frictional contact occasions and the damage risk, the finished stick pleat structure may be less coherent than desireable. Some efforts to improve the pleat structure have led to further frictional contact problems.

Efforts to solve these problems have produced many technically advanced shirring techniques and apparatus as epitomized, for example, in the U.S. Pat. Nos. 3,779,284 to Tums, 3,695,901 to Winokur, and 2,984,574 to Matecki, all of which are illustrative of the prior art relative to the present invention.

More recent developments comprehend a so-called constant force technique wherein grooved shirring elements are revolved around the casing with the grooves engaging the casing and advancing it into pleats. Illustrative of this shirring mode is U.S. Pat. No. 3,988,804 to Regner et al. While the technique described in U.S. Pat. No. 3,988,804 may, at least to some extent, reduce longitudinally and radially oriented frictional contacts on the closing, it introduces tangentially oriented frictional contacts.

The desiderata of shirred stick tubing fabrication are:
(a) no damage to the tubing material,
(b) the finished stick is straight,
(c) the stick is coherent, i.e., it resists crushing or breaking under handling and packing stresses,
(d) the stick deshirrs evenly and smoothly with constant applied stuffing force,
(e) the packing efficiency is optimum (100% theoretical maximum packing density),
(f) the stick is economically manufactured, and
(g) it can be consistently and reproducibly made to preselected standards.

Up to the time of the present invention, while significant advances have been made towards the attainment of these desirable ends, no marked advances have been made, particularly towards the elimination of the frictional rubbing, raking or clawing action of the shirring elements against the casing outer surfaces.

With this then being the state of the art, the present invention was conceived and developed to provide a novel and unique method and apparatus for shirring flexible tubing of cellulose or the like material into sticks having precise specified internal diameters, tightly packed interlocking pleat structures, smooth circularly-cylindrical uniform shapes, coherency, self-sustaining structural integrity, and a continuous helical major pleat structure. The present invention also provides a technique and apparatus for shirring tubing with a continuous, evenly applied force instead of intermittently applied force, which force simultaneously effects the pleating and the compacting or compression of the tubing material, thus obviating the need for a separate compression step in the overall shirring operation. More particularly, the present invention provides a method and apparatus for shirring tubing wherein the shirring and compacting force contact revolves continuously around the tubing being shirred without rotation of the shirring element which develops the force, thereby effectively substantially eliminating frictional contact or wiping action between the shirring element and the tubing.

These and other objects and features of the present invention will be the more fully understood and appreciated in the light of the ensuing more detailed description and the drawing, wherein:

FIG. 5 is a free body illustration of a shirring ring element according to the invention viewed axially with reference to the longitudinal axis of tubing being shirred;

FIG. 6 is a sectional view of the apparatus of FIG. 5 taken along the section lines 6—6 in FIG. 5;

FIG. 7 is a diagrammatic representation of successive views of the inside edge of a shirring ring element according to the invention as it revolves through one complete shirring cycle;

FIG. 8 is a side elevational diagrammatic representation of the locus developed by a tubing contact point on a shirring ring as it progresses through a single shirring cycle;

FIGS. 9 and 10 are further ring point path diagrams for various angular values of $\theta$ and different eccentricity relationships to the mandrel diameter.

Figure 16:
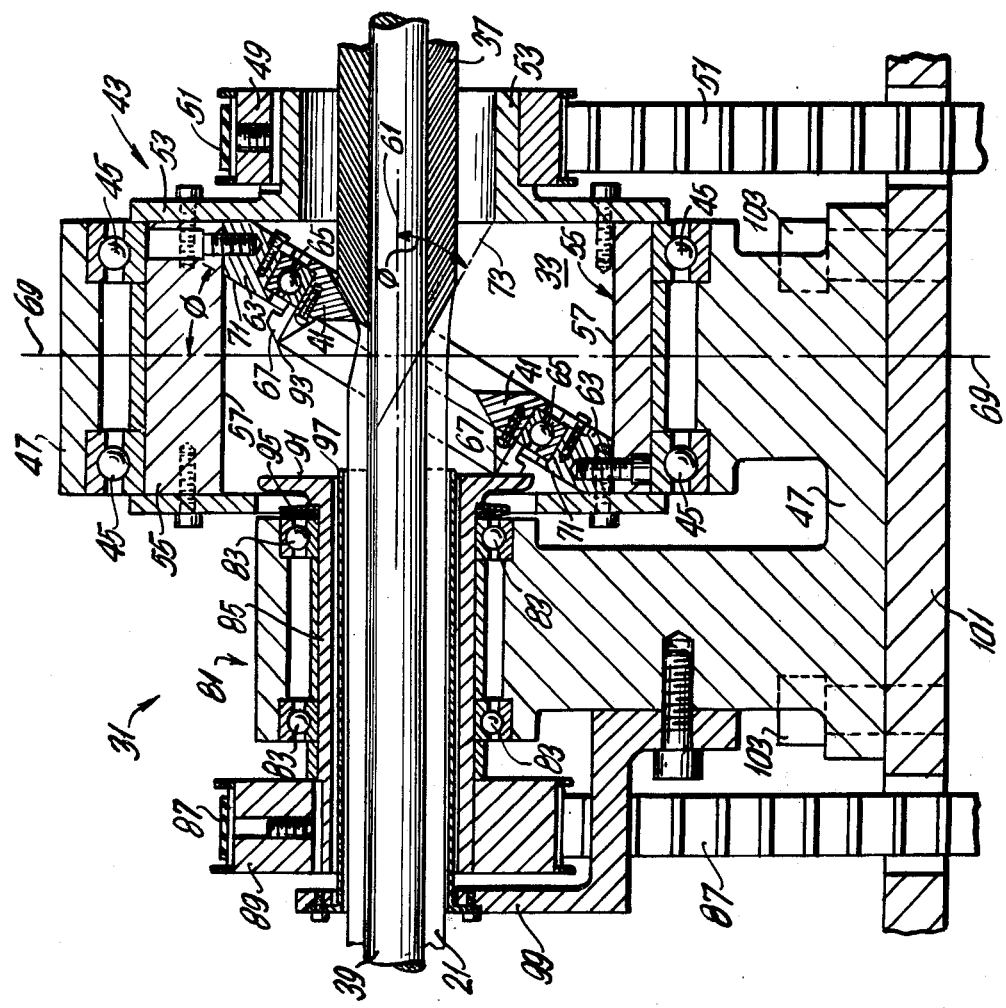
Figure 15:
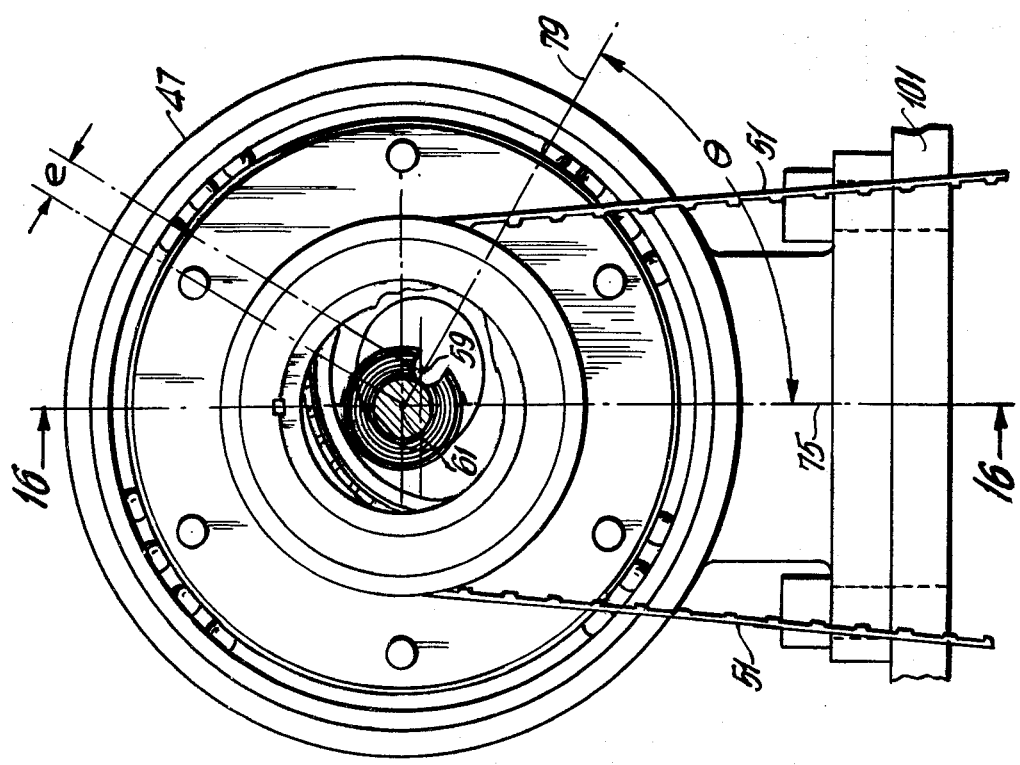

FIGS. 11, 12, 13, and 14 are sectional views through four alternative constructions for shirring ring element tubing contact surfaces;

FIG. 15 is an end view of shirring apparatus according to the present invention at a point where shirred tubing is advancing towards the viewer; and FIG. 16 is a cross-sectional view through FIG. 15, along sectionalizing line 16—16.

In general, the present invention comprehends a method wherein the tubing is directed along its longitudinal axis against a substantially constantly yielding force with a continuously applied gyrating arcuate line of shirring force, sequential portions of which line are directed to impinge on the tubing outer surface, urge the tubing forward in the direction of shirring progression while simultaneously indenting the tubing radially inward until a substantially complete major shirred pleat is formed, and continue the simultaneous direction of the shirring force forward and radially outward to compact the formed pleat against a shirred stick in formation.

Apparatus according to the invention comprises, in combination, a shirring station housing, an elongate hollow tubular mandrel passing through said housing having a longitudinal axis coincident with the longitudinal centerline of said housing, a yoke assembly disposed around the mandrel, rotatably mounted on said housing so as to have its rotational axis in parallelism with and offset eccentrically from the longitudinal axis of the mandrel, annular shirring ring means disposed around the mandrel rotatably mounted within the yoke, disposed in a plane displaced angularly from the mandrel longitudinal axis, and motive means to impart rotation to the yoke assembly.

The apparatus embodiments, according to the invention, might comprehend arrangements wherein the yoke assembly is provided with a cylindrical bore having its centerline in parallelism and offset eccentrically from the mandrel axis and, further, in combination with rotational drive means operably connected to the shirring ring means whereby rotational movement of said shirring ring means may be controllably varied independently of and in either direction with respect to the rotational movement of the yoke assembly.

Figure 1:
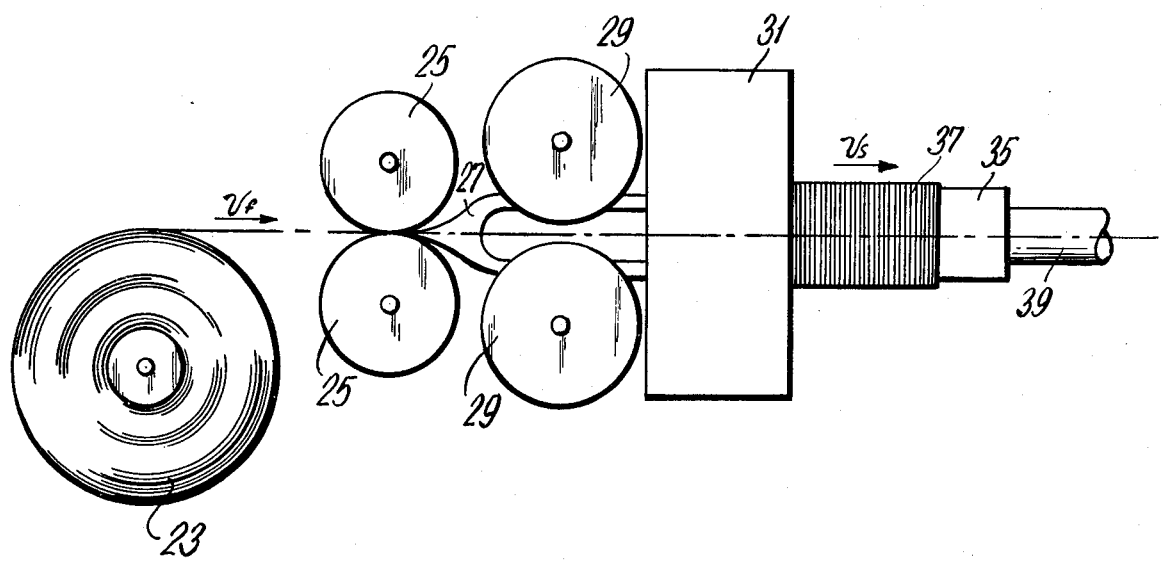
FIG. 1 is a schematic illustration of an arrangement of apparatus at a shirring station.

With reference to the drawing, FIG. 1 illustrates schematically the technique of and an arrangement of apparatus for shirring according to the present invention, wherein flattened unshirred tubing 21 from a supply reel 23 is advanced at a velocity $V_f$ through an array of metering rolls 25, an inflation zone 27, and feed rolls 29, into a shirring device 31 which contains an ectation assembly identified generally as 33, not shown in FIG. 1 but described in detail hereinafter. Within the shirring device 31, shirring force is applied to the tubing by the ectation assembly 33, continuously shirring or pleating and compressing the tubing against a stick 37 of already shirred tubing. The stick 37 of shirred tubing is constrained to move along a shirring mandrel 39 at a velocity $V_s$ which is considerably less than the velocity $V_f$ of the unshirred tubing by a resisting device, an abutment element 35 as shown, which moves along the mandrel 39 at velocity $V_s$. The resisting device may be of any suitable form, an abutment as illustrated, or a functional stick encircling device such as shown in U.S. Pat. No. 3,766,703 to Urbutis et al. The tubing is inflated with a gas, usually air, supplied through the mandrel 39 to the inflation zone 27. A lubricant, mineral oil for instance, may be added internally or externally of the tubing to facilitate the shirring operation. Other solutions, for example water or aqueous solutions may also be added to modify the tubing properties.

Figure 2:
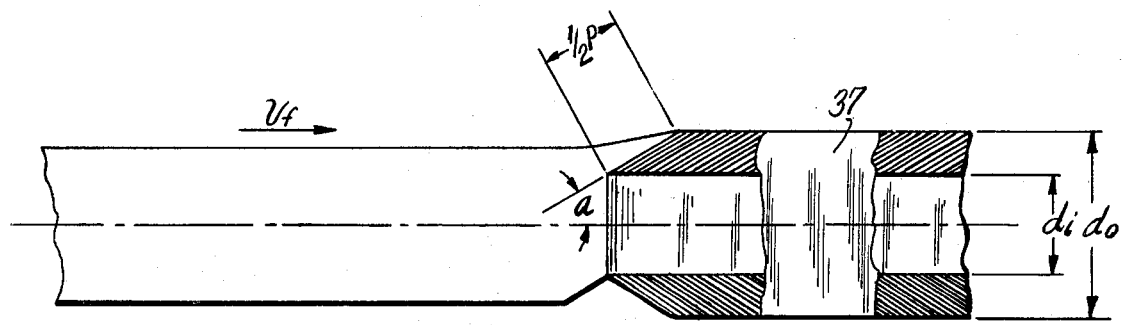
FIG. 2 is a sectionalized view of a length of shirred tubing made according to the invention.

The shirring device 31, by means of the ectation assembly 33, applies a shirring force to the inflated tubing 21 so as to cause the tubing wall to fold continuously upon itself into the shirred or pleated and compressed coherant structure of the stick 37 as shown in FIGS. 1 and 2.

Figure 3:
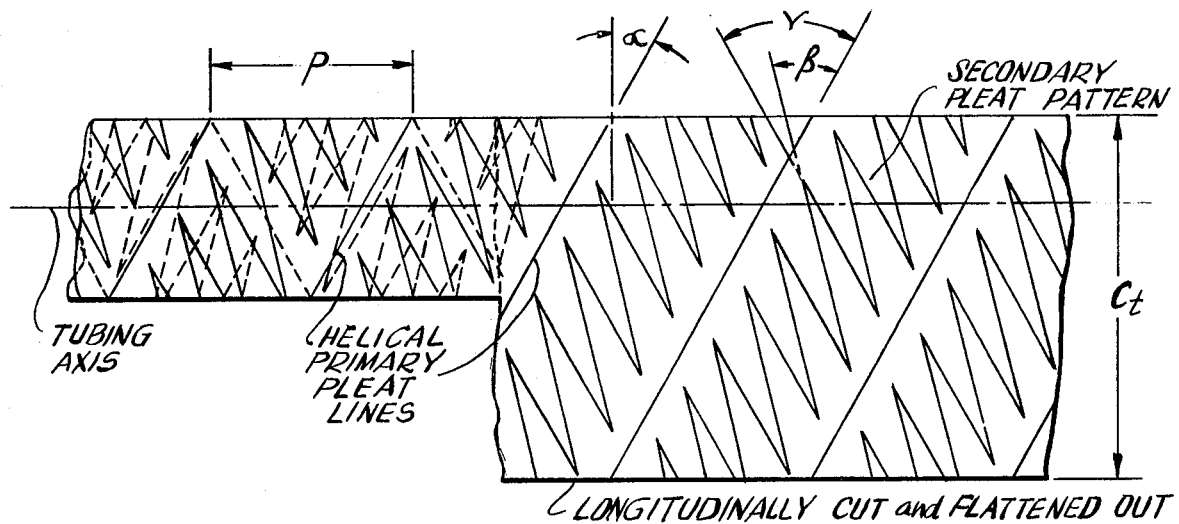
FIG. 3 is a diagrammatic representation of a length of tubing made according to the invention, deshirred, partially slit longitudinally, and flattened out.
Figure 4:
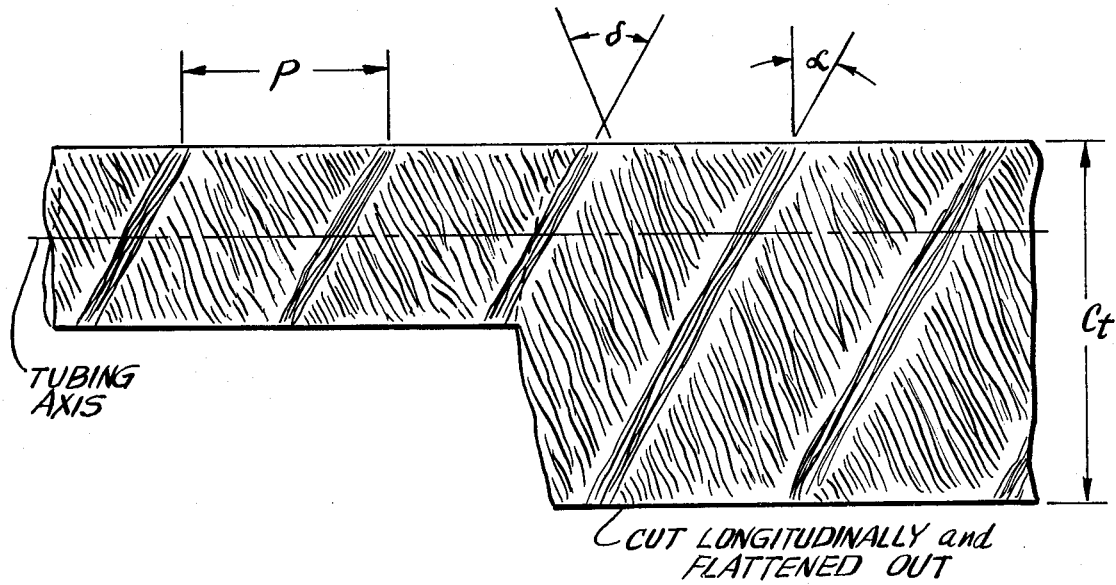
FIG. 4 is a diagrammatic representation of an alternate form of a length of tubing made according to the invention, deshirred, partially slit longitudinally, and flattened out.

The pleat structure in detail comprises a continuous helical primary fold with a secondary structure of pleats disposed in the spiralled space between successive revolutions of the primary fold. FIGS. 3 and 4 of the drawing show the helical primary fold and secondary pleat structure relationship. The helical primary fold lies and manifests itself on the outer circumference, diameter $d_o$ FIG. 2, of the shirred stick 37, and when the stick is deshirred, flattened out, slit along part of its length longitudinally, and folded open, the helical primary pleat appears in development as shown in FIG. 3. The axial distance between successive pleat spirals is the helical pleat pitch P as shown in FIG. 3, and is quantified by the relationship $$P = V_f/N \qquad (1)$$

where P is the pitch, Vf is the tubing feed velocity, and N is the cylic frequency of the shirring force.

The primary pleat is disposed at a helix angle $\alpha$ measured from a plane perpendicular to the tubing longitudinal axis, and which is quantified by the relationship $$\tan \alpha = P/C_t \qquad (2)$$

where $\alpha$ is the angle, P is the pitch, and $C_t$ is the tubing circumference as shown in FIGS. 3 and 4 where sections of deshirred tubing are shown cut longitudinally and flattened out.

The secondary pleat structure lies between the inside and outside diameters, $d_i$ and $d_o$ FIG. 2, of the stick. The detailed structure of the secondary pleats is characterized by and depends upon the tubing diameter $d_t$, the primary pleat pitch P, the stick cone angle a, FIG. 2, a theoretical stick inside diameter $d_i$, and the diameter $d_m$ of the mandrel 39 on which the tubing is shirred. The diameter $d_i$, the theoretical inside diameter of the finished stick 37 is given to a workably close approximation by the relation $$d_i = (P/2) \{[4(d_t/P)^2 - (\cos a)^2]^{0.5} - \sin a\} \qquad (3)$$

If the mandrel diameter $d_m$ is less than or equal to the diameter $d_i$ as given by the formula (3) above, then $d_i$ will be the actual stick inside diameter and the secondary pleat structure will comprise a substantially regular and repetitive zig-zag pattern of connected lines indicated as the secondary pleat pattern in FIG. 3 of the drawing. The zig-zag line segments constituting the secondary pleat pattern as shown, connect at points close to the helical primary pleat line and are oriented with respect to the primary pleat line at the angles $\beta$ and $\gamma$ respectively for the longer and shorter of the secondary pleat line segments as shown in FIG. 3. In such circumstances, that is to say, when the mandrel diameter $d_m$ is equal to or less than the inside diameter $d_i$ of the stick according to the formula (3), the secondary pleat folds longer segments may be described as substantially regularly defined inwardly pointing folds, each fold having at least a portion lying along a locus tangent to the inside diameter $d_i$ of the stick, and the shorter segments form outwardly pointing folds lying in the space obtaining between the stick inside diameter $d_i$ and its outside diameter $d_o$. Stated in another way, the substantially regular zig-zag secondary pleat pattern produced when $d_m$ is equal to less then $d_i$, has longer or major segments with respective portions lying along a helical locus at the inside diameter of the stick, and shorter or minor segments disposed within the mass of shirred tubing constituting the stick, in the zone between the stick inside diameter $d_i$ and its outside diameter $d_o$.

If, however, the mandrel diameter $d_m$ is greater than the theoretical inside diameter $d_i$ as given by the formula (3) above, then $d_m$ must, of course, determine and be equal to the actual stick inside diameter. This circumstance will produce the condition illustrated in FIG. 4 of the drawing wherein the secondary pleat syructure comprises a set of folds oriented generally at an angle $\delta$ with reference to the helical primary pleat line but otherwise randomly dispersed in the stick mass between its inside and outside diameters, and another set of random folds on either side of and more or less parallel to the helical primary fold.

The values of the angles $\beta$, $\gamma$ and $\delta$ depend on the tubing diameter and the helical primary pleat pitch, and are customarily within the range of from about 30° to about 60° as shown identified by their symbols in FIGS. 3 and 4 of the drawing.

Shirring according to the present invention is accomplished by applying a force continuously to the tubing being shirred to simultaneously urge the tubing forward along its axial path, form a continuous helical pleat structure, and pack the pleat structure continuously upon itself in successive layers to make a pleated and compacted coherent shirred stick. The ectating assembly 33 of the invention generates a gyrating passage through which the tubing is directed and wherein shirring force is applied along a continuous line of shirring which, for each discernible shirring cycle, extends axially, radially, and tangentially from a point of first contact of the tubing by the shirring element to a point of final packing of the formed pleat against the stick end cone. Each point on this line of shirring revolves continuously around the tubing in process without change in its radial or axial location. It should be noted here and understood that the line of shirring as described herein actually includes a small area on either side of the line due to the finite properties of the tubing and shirring elements.

Referring to FIGS. 5 and 6 of the drawing, a schematic free body representation of a shirring ring 41 illustrates the manner in which shirring force is generated and applied to shirr the tubing 21 into a coherent stick 37. In FIG. 5 is shown the arrangement of the shirring ring 41 with its center disposed eccentrically of the coincident axes of the stick 37 and the mandrel 39. The ring 41 is tilted so that in the view of FIG. 5 the upper half of the ring is towards the viewer and the lower half away from the viewer. The ring upper edge is thus visible in this FIG. 5 of the drawing. The ring 41 moves in a periodic cycle so that when points on the inside of the ring, such as j and k, are close to the tubing axis, they move forwardly, in the direction of tubing advance. Simultaneously, points p and q on the ring facing the diametrically opposite side of the tubing, are farther from the tubing axis and move rearwardly, opposite to the direction of tubing advance. A short time later in the cycle, points k and l on the ring are closest to the tubing axis and move forwardly while points q and r on the ring facing the diametrically opposite side of the tubing are farther from the tubing axis and move rearwardly. As the cycle continues, the ring 41 moves close to, and forwardly along, the tubing axis at angular positions 1, 2, 3, and so on through 12, in sequence. It will be understood that the motion is continuous and the progression past the numbered positions 1 through 12 merely represents portions of the periodic cycle. It will be further understood that the ring 41 points i, j, k, and so on, merely denote reference points in the cycle where the ring is closest to the tubing axis at corresponding angular positions and do not represent particular physical points of the ring material.

Referring again to FIG. 5, the center of the shirring ring 41 is offset from the tubing axis by a distance e, the ring eccentricity. The ring axis is tilted with respect to the tubing axis by an angle $\phi$, the nutation angle, as shown in FIG. 6, so that the ring appears elliptical in FIG. 5. The eccentrically offset center of this tilted ring follows a circular path around the tubing axis and the ring axis revolves around the tubing axis while maintaining a constant nutation angle $\phi$ so that the ellipse in FIG. 5 appears to revolve. FIG. 7 shows a plot of 12 successive elliptical views of the inside edge of the ring 41 as it revolves through one cycle.

To further describe the ring motion, let a nutation plane be defined as a plane which contains the tubing axis and is parallel to and may contain the ring axis. This plane is the plane of FIG. 6 and appears in edge view as section 6—6 in FIG. 5. Let an eccentric plane be defined as a plane which contains both the stick axis and the ring 41 center, a point both on the ring axis and in the ring plane as shown in FIG. 6 and generally within the boundaries of the ring's thickness. The ring plane is defined as a plane perpendicular to the ring axis, located at the point on the ring axis, the ring center, where the eccentric distance of the ring center from the stick axis is measured. Referring to FIG. 5, where both the nutation and eccentric planes appear in edge view, the eccentric plane is angularly displaced with respect to the nutation plane by the angle $\phi$, the eccentric plane advance or phase angle. As the ring 41 revolves around the mandrel 39 axis, the ring axis maintains its fixed tilt, or nutation angle $\phi$, and both planes rotate simultaneously with the fixed phase angle $\theta$. In this way, the ring performs a motion which is a combination of eccentric revolution and nutation, which motion gives rise to the term ectation, used herein to define and describe the combined eccentric revolution and nutation motions of the shirring ring 41.

It will be understood that the term eccentric revolution is herein used to describe the motion of the ring 41 center about the mandrel 39 axis, but is not intended to imply rotation of the ring 41 about its own axial centerline. The ectating motion depends only on the three parameters e, $\phi$, and $\theta$. Thus, a mark "X" engraved in the ring material could maintain a fixed angular position with respect to the ring center, for example, above the center as shown in FIG. 5, or could move at an arbitrary rate in either direction around the ring 41 center with no effect whatever on the ectating motion.

During a typical ectation cycle, a ring point located at a particular angular position follows a looped path in that axial plane, such as the path of point i shown in FIG. 8. If the cycle is started when the ring center is at angular position 8, point i is in its most advanced position and has started to move away from the tubing axis. A short time later in the cycle, when the ring center is at angular position 9, ring point i has started to move rearwardly and is farther away from the tubing axis. The cycle continues through points corresponding to the ring center at angular positions 10, 11, 12, 1, and so on through the complete cycle. Cross-sections of the ring profile orientation at point i are shown in FIG. 8 for each of these positions. Identical paths can be drawn for other ring points such as j, k, l, and so on, but the ring center positions 1, 2, 3 and so on, for the path of point j are one-twelfth of a cycle later than the positions shown for point i. Similarly, the positions for the path of point k are two-twelfths of a cycle later than the positions shown for point i. The path of point o is shown on FIG. 8 with the ring center positions one-half cycle later, or opposite to, those for point i. The sequential relationship of the positions for the paths of the twelve ring points used to explain the operation of the invention are illustrated in Table I, below.

TABLE I

Ring Center Positions for Twelve Points on Inside of Shirring Ring

| Ring Point | Ring point fully rearward Forward motion | | | | | | Ring point fully forward Rearward motion | | | | | |
|---|---|---|---|---|---|---|---|---|---|---|---|---|
| i | 1 | 2 | 3 | 4 | 5 | 6 | 7 | 8 | 9 | 10 | 11 | 12 |
| j | 2 | 3 | 4 | 5 | 6 | 7 | 8 | 9 | 10 | 11 | 12 | 1 |
| k | 3 | 4 | 5 | 6 | 7 | 8 | 9 | 10 | 11 | 12 | 1 | 2 |
| l | 4 | 5 | 6 | 7 | 8 | 9 | 10 | 11 | 12 | 1 | 2 | 3 |
| m | 5 | 6 | 7 | 8 | 9 | 10 | 11 | 12 | 1 | 2 | 3 | 4 |
| n | 6 | 7 | 8 | 9 | 10 | 11 | 12 | 1 | 2 | 3 | 4 | 5 |
| o | 7 | 8 | 9 | 10 | 11 | 12 | 1 | 2 | 3 | 4 | 5 | 6 |
| p | 8 | 9 | 10 | 11 | 12 | 1 | 2 | 3 | 4 | 5 | 6 | 7 |
| q | 9 | 10 | 11 | 12 | 1 | 2 | 3 | 4 | 5 | 6 | 7 | 8 |
| r | 10 | 11 | 12 | 1 | 2 | 3 | 4 | 5 | 6 | 7 | 8 | 9 |
| s | 11 | 12 | 1 | 2 | 3 | 4 | 5 | 6 | 7 | 8 | 9 | 10 |
| t | 12 | 1 | 2 | 3 | 4 | 5 | 6 | 7 | 8 | 9 | 10 | 11 |

The exact shape of the ring point path depends on the values of the ring eccentricity e, the nutation angle $\phi$, and the eccentric plane phase angle $\theta$. The total radial displacement in the path is 2 e. The relative radial positions at the extremes of axial displacement depend on the value of $\theta$ and are equal when $\theta$ is equal to 90°. The total axial displacement depends on the values of e, $\phi$, and $\theta$. The path plots shown in FIG. 8 are for $\phi=30°$, $\theta=60°$, and e approximately equal to the mandrel radius. FIG. 9 shows the effect of various values of $\theta$ on the path where e is approximately equal to the mandrel diameter. FIG. 10 shows the effect of making the eccentricity much smaller than the mandrel diameter.

It is preferred that the ring path be chosen so that the ring is effective to both advance the tubing and pack the pleats against the stick cone. For advancing the tubing, the inside edge of the ring should indent the inflated tubing during as much as possible of its forward motion, and should not indent the tubing before beginning its forward motion. For the tubing size and ring eccentricity of FIG. 9, inspection of the ring point path diagrams suggests that effective feeding and pleating is possible if the eccentric plane advance, or phase angle $\theta$, with reference to the nutation plane, is at least 60° and not more than 100°. In contrast, for the smaller ring eccentricity and larger tubing size of FIG. 10, effective feeding may occur only if $\theta$ is in the range 45°–60°. Referring again to FIGS. 9 and 10, it can be seen that the ring point, in the last portion of its forward motion, moves away from the tubing axis to an extent dependent on the values of e and $\theta$. This forward and radially outward motion causes the ring packing surface to slide over the cone on the end of the stick of shirred tubing, thereby assisting in the pleat formation, but also causing some friction. It will be therefore understood that the preferred values of the ectation parameters, e, $\phi$, and $\theta$, represent a compromise to enable the shirring ring to advance the tubing and pack the pleats effectively without excessive friction on the tubing. This is considered to be an operational parameter adjustment well within the skills of persons conversant with the art.

The general arrangement of apparatus according to the invention is shown at FIG. 1 of the drawing which is described hereinabove. Devices in such a general arrangement of apparatus for metering, feeding, inflating and lubricating the tubing are well known in the shirring art. Similarly, devices for metering, severing and removing shirred stick lengths from the mandrel are also well known. Only the shirring device 31 as shown in FIG. 1 involves the apparatus of the present invention which constitutes the novel advance in the shirring art.

The shirring device 31 is shown in detail in FIGS. 15 and 16 of the drawing. FIG. 15 is a view along the stick 37 and mandrel 39 axes, which coincide, of the end where shirred tubing is discharged towards the viewer. FIG. 16 is a cross-sectional view through FIG. 15, taken mostly centrally but offset as indicated by the section line with respect to the tilted components of and associated with the shirring ring 41.

Referring to FIGS. 15 and 16, unshirred inflated tubing 21 is fed into the shirring device 31 to the ectation assembly indicated generally as 33. Ectation assembly 33 mounts a shirring ring 41 which is driven in an ectating mode which causes, referring to FIG. 16, the ring to indent and advance the tubing 21, form a continuous helical pleat, and pack the formed pleat thus formed in a continuous helical spiral against the conical end of the stick 37 of shirred tubing. The stick 37 moves away from the shirring ring 41 at a rate $V_s$ which is considerably less than the tubing feed rate $V_f$, and on down the mandrel 39 bearing against the controlled resistance of the abutment 35, FIG. 1.

Ectation assembly 33 mounts in a yoke assembly 43 which is in turn rotatably mounted through bearings 45 in a stationary housing 47 which constitutes the main body element of the shirring device 31. A pulley 49 driven by a belt 51 drives the yoke assembly 43 through a bossed endplate 53 attached to the yoke assembly, by bolts or any other suitable means. The rotatably mounted yoke assembly 43 comprises a cylinder 55 having an eccentric bore which defines an eccentric inner cylindrical surface 57 relative to the eccentric bore axis 59. When the yoke assembly 43 is rotated on its axis 61, which as shown in the drawings coincides with the axes of the stick 37 and the mandrel 39, the eccentric axis 59 revolves around the coincident central axes of the yoke assembly, the stick and the mandrel, generating an eccentric revolution of eccentricity e induced in the ectation assembly 33 and the shirring ring 41.

Ectation assembly 33 comprises nutation block 63, bearing 65 disposed to mount shirring ring 41 rotatably moveably in the nutation block, and a shirring ring drive plate 67 attached to the ring 41 by machine screws as shown in FIG. 16, or by alternative suitable means.

For descriptive reference purposes a plane 69 is shown in FIG. 16 perpendicular to the coincident yoke assembly axis 61 and the stick and mandrel axes. The nutation block 63 is mounted atilt on the eccentric inner cylindrical surface of cylinder 55 by mounting screws or other suitable fastening means so that its facial plane 71 is at an angle $\phi$ with reference to plane 69. The shirring ring 41, drive plate 67, and bearing 65 assembly is mounted centrally in nutation block 63 so that the ring central axis 73 is disposed perpendicularly to nutation block facial plane 71 and consequently will be in the angular relationship $\phi$ with respect to axis 61, as shown in FIG. 16.

As the yoke assembly 43 is rotated by pulley 49 and belt 51, ring axis 73 revolves around axis 61 while maintaining the fixed angular relationship $\phi$. In this manner a nutating motion is superimposed upon and combined with the eccentric revolution of the ectation assembly 33 and shirring ring 41. For any particular set of operating conditions according to the invention, the shirring ring moves at a fixed nutation angle $\phi$, a fixed eccentricity e, and a fixed angular relationship $\theta$, called the phase angle, between the nutation plane and the eccentric plane. The phase angle relationship produces the looped shirring force path and practice has indicated that phase angles within the range of from about 40° to about 120° will effect workable results.

FIG. 15 shows a nutation plane 75, defined as a plane in which axis 61 lies and which is parallel to the shirring ring axis 73. Further, with reference to FIG. 15, an eccentric plane 79 is shown, and is defined as a plane in which lie both axis 61 and the shirring ring 41 center, shown as a point on eccentric axis 59 located at the eccentric distance e from axis 61. During the rotation of the yoke assembly 43, planes 75 and 79 maintain a fixed relationship to each other at the phase angle $\theta$, the value of which depends on the angular position of the tilted nutation block 63 with respect to the inner eccentric surface 57 of the cylinder 55. By adjustment, then, of the phase angle $\theta$, optimum ectating shirring performance may be attained for any eccentricity e and nutation angle $\phi$.

The ectating motion of the shirring ring 41 does not depend on rotation of the ring. For the purpose of minimizing frictional sliding contact of the ring against the tubing 21, it is preferred that the ring be rotated in a controlled manner so as to achieve a rolling action against the stick cone. The bearing 65 provides freedom for the ring to rotate independently of the rotation of the yoke assembly 43, or not rotate at all. In order to effect the desired condition of controlled rotation in the shirring ring 41, a ring drive assembly is provided. Ring drive assembly 81 is rotatably mounted in stationary housing 47 on bearings 83, and comprises a ring drive tube 85 which is rotated by belt 87 through pulley 89. One end of the ring drive tube 85 extends into the rotating yoke assembly 43 and is flanged to form a traction surface 91 which is urged into frictional drive contact with conical surface 93 of ring drive plate 67 by thrust springs 95. By rotating ring drive assembly 81 in a direction opposite to the direction of rotation of yoke assembly 43, and at an appropriate speed proportional to the rotational speed of assembly 43, the rotation speed of shirring ring 41 may be maintained at zero. By increasing the speed of ring drive assembly 81, the shirring ring 41 may be made to rotate in a direction opposite to that of assembly 43. By reducing the speed of drive assembly 89, the shirring ring 41 may be made to rotate in the same direction as, and at a speed proportional to the speed of assembly 43.

A guide tube 97 is fixedly attached to stationary housing 47 by means of bracket 99, to assist in maintaining the position of the inflated tubing 21 centered on axis 61 as the shirring ring 41 indents the tubing, and also to shield the tubing from rotating ring drive tube 85.

The shirring device 31 is mounted on shirring machine frame 101 so that its rotational axis 61 coincides with the mandrel 39 axis and is fixedly attached, for instance, by bolts 103. Power is supplied to the belts 51 and 87 by electrical and mechanical drive components not part of this invention and within conventional skills in the art. Means are also provided for dynamic balancing of rotating yoke assembly 43, and for lubrication of the bearings comprised in the apparatus.

The illustrated and described and alternative modes of driving, connecting, balancing, adjusting and lubricating apparatus used conjunctively with the invention are considered to be well within the ken of persons conversant with the art, and will therefore not be treated in any great detail in this presentation.

Shirring performance according to the invention depends upon the shirring ring point path as depicted in FIGS. 7, 8, 9, and 10 of the drawing, and the path selected to attain optimum shirring performance is determined in turn on the diameter of tubing being shirred and the required inside diameter of the stick. The point path loci are controlled by appropriate choices and combinations of the eccentricity e, the nutation angle $\phi$, and the phase angle $\theta$.

EXAMPLE I

Successful shirring with consistantly reproducible results has been accomplished in tests run on regenerated cellulose tubing of the type used for frankfurter manufacturing. Tubing of 3.175 centimeters flat width was shirred into sticks with inside diameter of 1.27 centimeters with the values of the parameters eccentricity e set at 0.305 centimeters, the nutation angle $\phi$ at 30°, and the phase angle $\theta$ at values of from 60° to 90°.

EXAMPLE II

For shirring a larger plastic cellulosic tubing having a 19.05 centimeter flatwidth into sticks of 6.35 centimeters inside diameter, good reproducible results can be attained with the values of the parameters eccentricity e set at 6.35 centimeters, the nutation angle $\phi$ at 42°, and the phase angle $\theta$ at 75°.

By way of some general guidelines in the selection of operating parameters for the successful practice of the invention, the value of e, the eccentricity, should be sufficiently large to provide clearance for the rearward travel of the shirring ring inner edge or point without it interfering with the unshirred tubing which it is passing in the opposite direction, the nutation angle $\phi$ should be of an angular value sufficient to provide an axial total travel motion of the ring point about equal to or greater than the pitch P of the major pleat, and the phase angle $\theta$ should be set to attain smooth positive feeding of the tubing without unduly excessive frictional rubbing or sliding against the stick cone face. Experience indicates that phase angle $\theta$ values of from 60° to 90° are preferable in instances where the unshirred tubing diameter is relatively large with respect to the stick inside diameter.

Shirring rings according to the invention are fabricated preferably to have high mechanical strength and low friction against the tubing. Suitable materials for the rings include, by way of illustration, steel, bronze, aluminum, and low friction hard plastics, such as Teflon or Teflon-filled polyurethane. If the rings are made of a metal or other material having an unsuitable coefficient of friction, they may be covered with a low friction coating.

FIGS. 11, 12, 13, and 14 show four possible profiles for the shirring ring 41 tubing contact surface, varied according to the particular stick cone surface shape desired. Variations in cone shape and shirring ring profile make possible the attainment of coherence, uniformity of density of packing, and uniformity of packing with the various types and styles of tubing encountered, some with special internal or external, or both, coatings, and with other special attributes and characteristics which can be best accommodated to make a uniformly good stick by selecting an especially appropriate ring profile either like one of those illustrated in drawing FIGS. 11, 12, 13, 14 or some other. Any desired shirring ring profile can be used within the intended scope and spirit of this invention.

Alternative modes of construction of apparatus according to the invention are also possible. Instead of the arrangement shown in drawing FIGS. 15, 16, for instance, the shirring ring bearing 65 may be mounted eccentrically in a nutation block 63 which mounts in turn centrally of a cylinder 65. In such arrangement, the eccentricity is attained by mounting a circular plate with an eccentrically positioned circular inner hole surface centrally of the nutation block. The ring 41 and bearing 65 are then mounted in this eccentric inner surface. In such an arrangement, the phase angle $\theta$ is adjusted by rotating the circular plate to the desired position within the nutation block.

What is claimed is:

1. A method for shirring inflated cylindrical flexible tubing into shirred sticks, which method comprises directing the tubing along its longitudinal axis against a substantially constantly yielding force with a continuously applied gyrating arcuate line of shirring force, sequential portions of which line are directed to
   (a) impinge on the tubing outer surface,
   (b) urge the tubing forward in the direction of shirring progression while simultaneously indenting the tubing radially inward,
   (c) continue the simultaneous direction of the shirring force forward and radially inward until a substantially complete major shirred pleat is formed, and
   (d) continue the simultaneous direction of the shirring force forward and radially outward to compact the formed pleat against a shirred stick in formation.

2. A method according to claim 1 wherein the line of shirring force is generated by at least one element disposed to at least partly surround the tubing.

3. Apparatus for shirring flexible tubing, comprising, in combination:
   (a) a shirring station housing;
   (b) an elongated hollow tubular mandrel passing through said housing having a longitudinal axis parallel with the longitudinal centerline of said housing;
   (c) a yoke assembly disposed around the mandrel, rotatably mounted on said housing so as to have its rotational axis in parallelism with and offset eccentrically from the longitudinal axis of the mandrel;
   (d) annular shirring ring means disposed around the mandrel rotatably mounted within the yoke assembly disposed in a plane displaced angularly from the mandrel longitudinal axis, and
   (e) motive means to impart rotation to the yoke assembly.

4. Apparatus according to claim 3 wherein the yoke assembly is provided with a cylindrical bore having a centerline in parallelism with and offset eccentrically from the longitudinal axis of the mandrel, and the shirring ring is rotatably mounted within the yoke cylindrical bore.

5. Apparatus according to claim 3 in combination with rotational drive means operably connected to the shirring ring means whereby rotational movement of said shirring ring means may be controllably varied independently of and in either direction with respect to the rotational movement of the yoke assembly.

6. Apparatus according to claim 4 in combination with rotational drive means operably connected to the shirring ring means whereby rotational movement of said shirring ring means may be controllably varied independently of and in either direction with respect to the rotational movement of the yoke assembly.

* * * * *